(12) United States Patent  (10) Patent No.: US 8,503,805 B2
Lee  (45) Date of Patent: Aug. 6, 2013

(54) METHOD AND APPARATUS FOR ENCODING AND DECODING IMAGE ADAPTIVE TO BUFFER STATUS

(75) Inventor: Yun-gu Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 832 days.

(21) Appl. No.: 12/617,793

(22) Filed: Nov. 13, 2009

(65) Prior Publication Data

US 2010/0128996 A1 May 27, 2010

(30) Foreign Application Priority Data

Nov. 21, 2008 (KR) ........................ 10-2008-0116412

(51) Int. Cl.
*G06K 9/46* (2006.01)
*H04N 7/12* (2006.01)
(52) U.S. Cl.
USPC .............. 382/239; 375/240.03; 375/240.24
(58) Field of Classification Search
USPC ................... 382/239; 375/240.03, 240.24
See application file for complete search history.

(56) References Cited

U.S. PATENT DOCUMENTS

| | | | | | |
|---|---|---|---|---|---|
| 5,426,463 | A | * | 6/1995 | Reininger et al. | 375/240.03 |
| 5,552,832 | A | * | 9/1996 | Astle | 375/240.24 |
| 5,614,952 | A | * | 3/1997 | Boyce et al. | 375/240.01 |
| 5,761,398 | A | * | 6/1998 | Legall | 358/1.15 |
| 5,835,149 | A | * | 11/1998 | Astle | 375/240.05 |
| 6,094,455 | A | * | 7/2000 | Katta | 375/240.05 |
| 6,160,846 | A | * | 12/2000 | Chiang et al. | 375/240.05 |
| 6,263,020 | B1 | * | 7/2001 | Gardos et al. | 375/240.03 |
| 6,493,392 | B1 | * | 12/2002 | Chung et al. | 375/240.27 |
| 6,792,046 | B2 | * | 9/2004 | Hatano et al. | 375/240.24 |
| 7,346,106 | B1 | * | 3/2008 | Jiang et al. | 375/240.12 |
| 2002/0001343 | A1 | * | 1/2002 | Challapali et al. | 375/240.01 |
| 2002/0012394 | A1 | * | 1/2002 | Hatano et al. | 375/240.02 |
| 2002/0012395 | A1 | * | 1/2002 | Song et al. | 375/240.03 |
| 2003/0235220 | A1 | * | 12/2003 | Wu et al. | 370/535 |
| 2003/0235247 | A1 | * | 12/2003 | Wu et al. | 375/240.03 |
| 2004/0105492 | A1 | * | 6/2004 | Goh et al. | 375/240.03 |
| 2005/0025236 | A1 | * | 2/2005 | Yan et al. | 375/240.03 |
| 2005/0201460 | A1 | * | 9/2005 | Kang et al. | 375/240.03 |
| 2005/0286635 | A1 | * | 12/2005 | Kumar et al. | 375/240.16 |
| 2006/0093032 | A1 | * | 5/2006 | Shindo | 375/240.03 |
| 2008/0232459 | A1 | * | 9/2008 | Auyeung | 375/240.01 |
| 2008/0232465 | A1 | * | 9/2008 | Zhang | 375/240.03 |
| 2009/0046778 | A1 | * | 2/2009 | Lee et al. | 375/240.03 |

FOREIGN PATENT DOCUMENTS

JP         06014314 A    *  1/1994

* cited by examiner

*Primary Examiner* — Wenpeng Chen
(74) *Attorney, Agent, or Firm* — Sughrue Mion, PLLC

(57) ABSTRACT

A method of encoding an image includes checking a storage status of a buffer storing encoded data, at every data unit equal to or less than at least one macroblock; rearranging information about a macroblock so that encoded data of the macroblock is reduced, based on the storage status of the buffer; and storing data encoded by using data of the image and the information about the macroblock, which is rearranged based on the storage status of the buffer, in the buffer.

23 Claims, 3 Drawing Sheets

METHOD AND APPARATUS FOR ENCODING AND DECODING IMAGE ADAPTIVE TO BUFFER STATUS

CROSS-REFERENCE TO RELATED PATENT APPLICATION

This application claims priority from Korean Patent Application No. 10-2008-0116412, filed on Nov. 21, 2008, in the Korean Intellectual Property Office, the disclosure of which is incorporated herein by reference in its entirety.

BACKGROUND OF THE INVENTION

1. Field of the Invention

Apparatuses and methods consistent with the present invention relate to encoding and decoding an image via streaming using a buffer.

2. Description of the Related Art

A data transmission system, which transmits data via streaming between an encoding unit and a decoding unit, stores a bit string generated in the encoding unit in a buffer, and then transmits the bit string. The decoding unit receives the bit string via a channel, decodes the bit string, reconstructs an image from the bit string, and stores or reproduces the image.

Data transmission speed of the channel is generally fixed, but a bit amount generated in the encoding unit increases or decreases according to the complexity of an image. When a bit rate suddenly increases in the encoding unit, the buffer may overflow, thereby delaying data transmission.

In order to generate a bit string having data of uniform size, the encoding unit may use a rate control algorithm.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides encoding and decoding of an image for real time streaming.

According to an aspect of the present invention, there is provided a method of encoding an image, the method including: checking a storage status of a buffer storing encoded data, for every data unit equal to or lower than at least one macroblock; rearranging information about a macroblock so that encoded data of the macroblock is reduced, based on the storage status of the buffer; and storing data encoded by using data of the image and the information about the macroblock, which is rearranged based on the storage status of the buffer, in the buffer.

The rearranging of the information about the macroblock may include, when a data accumulation rate of the buffer exceeds a first threshold value, rearranging information about a macroblock having a predetermined encoding operation order.

The rearranging of the information about the macroblock may further include, when the data accumulation rate of the buffer decreases to a second threshold value due to the rearranging of the information about the macroblock having the predetermined encoding operation order, performing a predetermined encoding operation by using actual information of a macroblock under the predetermined encoding operation.

A delay time between encoding and decoding of the image may be within one frame.

The rearranging of the information about the macroblock may include, when a data accumulation rate of the buffer exceeds a first threshold value, deleting predetermined data from among data of a macroblock having a predetermined encoding operation order.

In the rearranging of the information about the macroblock, the macroblock having the predetermined encoding operation order may include at least one of a macroblock before being frequency transformed, a frequency transformed macroblock, and a quantized macroblock.

The rearranging of the information about the macroblock may include, when a data accumulation rate of the buffer exceeds a first threshold value, deleting a symbol of the macroblock from among an encoded bit string of the image.

The rearranging of the information about the macroblock may include, when a data accumulation rate of the buffer exceeds a first threshold value, setting the macroblock in a skip mode.

The macroblock set in the skip mode may be estimated by using at least one macroblock adjacent to the macroblock.

The method may further include transmitting information indicating that the macroblock is in the skip mode.

The rearranging of the information about the macroblock may include, when the macroblock is a macroblock of a P frame and a data accumulation rate of the buffer exceeds a first threshold value, setting the macroblock as an inter block.

The rearranging of the information about the macroblock may further include deleting a motion vector of the macroblock from a transmission bit string.

The method may further include transmitting information indicating that the macroblock is the inter block.

According to another aspect of the present invention, a method of decoding an image may include receiving a bit string of the image via a channel; estimating data of a macroblock, based on encoding information that is rearranged in a macroblock unit based on a storage status of a buffer while encoding the bit string; and reconstructing the image by using the estimated data.

In the estimating of the data of the macroblock, when a current macroblock is set in a skip mode, the current macroblock may be estimated by using the current macroblock and an adjacent macroblock.

The estimating of the data of the macroblock may include, when a current block is set in a skip mode, estimating data of the current macroblock as a predetermined constant value by using an macroblock adjacent to the current macroblock during an decoding process.

The estimating of the data of the macroblock may include, when a current macroblock is set as an inter block of a P frame, estimating the current macroblock by using a reference macroblock of a reference frame.

A delay time between encoding and decoding of the image may be within one frame.

The encoding information that is rearranged in the macroblock unit may be generated by rearranging information about a macroblock in the macroblock unit when a data accumulation rate of the buffer exceeds a first threshold value during an encoding process, and performing a predetermined encoding operation by using actual information of a macroblock undergoing the predetermined encoding operation when the data accumulation rate of the buffer decreases to a second threshold value due to the rearranged information about the macroblock in the macroblock unit.

The encoding information that is rearranged in the macroblock unit may indicate data of a macroblock that is rearranged after predetermined data from among data of a macroblock having a predetermined encoding operation order is deleted.

The macroblock having the predetermined encoding operation order may be at least one of a macroblock before being frequency transformed, a frequency transformed macroblock, and a quantized macroblock.

The encoding information that is rearranged in the macroblock unit may indicate a bit string that is rearranged after a symbol of the macroblock from among an encoded bit string of the image is deleted.

According to another aspect of the present invention, there is provided an apparatus for encoding an image, the apparatus including: a buffer which stores a bit string of encoded data; a buffer checking unit which checks a storage status of the buffer for every data unit equal to or lower than at least one macroblock; and a macroblock information rearranging unit which rearranges information about a macroblock so that encoded data of the macroblock is reduced, based on the storage status of the buffer, wherein data encoded by using data of the image and the information about the macroblock, which is rearranged based on the storage status of the buffer, is stored in the buffer.

According to another aspect of the present invention, there is provided an apparatus for decoding an image, the apparatus including: a receiver which receives a bit string of the image via a channel; a macroblock estimator which estimates data of a macroblock, based on encoding information that is rearranged in a macroblock unit based on a storage status of a buffer while encoding the bit string; and an image reconstructor which reconstructs the image by using the estimated data.

According to another aspect of the present invention, there is provided a computer readable recording medium having recorded thereon a program containing steps for causing a computer to execute the method of encoding an image described above.

According to another aspect of the present invention, there is provided a computer readable recording medium having recorded thereon a program containing steps for causing a computer to execute the method of decoding an image described above.

BRIEF DESCRIPTION OF THE DRAWINGS

The above and/or other aspects of the present invention will become more apparent by describing in detail certain exemplary embodiments thereof with reference to the accompanying drawings in which.

DETAILED DESCRIPTION OF EXEMPLARY EMBODIMENTS

Hereinafter, a method of adjusting data remaining in a buffer during encoding for real time streaming, according to an exemplary embodiment of the present invention will be suggested with reference to FIGS. 1 through 6. Also, a method and apparatus for encoding an image and a method and apparatus for decoding an image bit string, for streaming using a buffer will be described.

Figure 1:
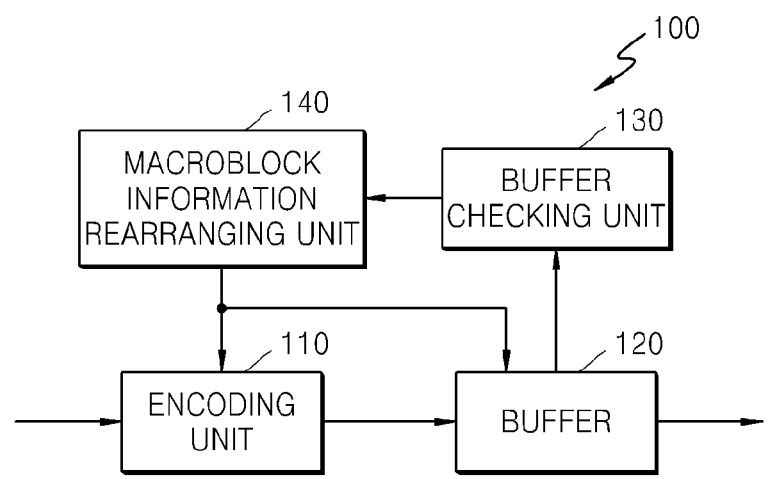
FIG. 1 is a block diagram illustrating an apparatus for encoding an image for real time streaming, according to an exemplary embodiment of the present invention.

FIG. 1 is a block diagram illustrating an apparatus 100 for encoding an image for real time streaming, according to an exemplary embodiment of the present invention.

The apparatus 100 includes an encoding unit 110, a buffer 120, a buffer checking unit 130, and a macroblock information rearranging unit 140.

The encoding unit 110 performs several processes for encoding image data. When the apparatus 100 complies with a video compression standard, the encoding unit 110 may perform, for example, but not limited to, at least one of frequency transformation, quantization, entropy encoding, and motion estimation on the image data.

The buffer 120 stores an encoded bit string on which entropy encoding is performed. The buffer checking unit 130 checks a storage status of the buffer 120 for every data unit equal to or less than at least one macroblock. The macroblock information rearranging unit 140 rearranges information about a macroblock so that encoded data of the macroblock is reduced, based on the storage status of the buffer 120 checked by the buffer checking unit 130. The apparatus 100 stores a bit string encoded by the macroblock information rearranging unit 140 and the encoding unit 110, in the buffer 120. The buffer 120 may be a buffer memory or a cache.

The buffer checking unit 130 may measure a data accumulation rate of data stored in the buffer 120 as a storage status of the buffer 120. The macroblock information rearranging unit 140 compares the data accumulation rate of the buffer 120 measured by the buffer checking unit 130 with predetermined threshold values. Two threshold values, i.e., a first threshold value and a second threshold value, are used as the predetermined threshold values.

The macroblock information rearranging unit 140 reacts when the data accumulation rate of the buffer 120 exceeds the first threshold value during encoding in a general mode. Also, the macroblock information rearranging unit 140 operates in a reduction mode for reducing data stored in the buffer 120, and reacts when the data accumulation rate of the buffer 120 decreases to the second threshold value or lower.

Preferably, when the data accumulation rate of the buffer 120 exceeds the first threshold value, the macroblock information rearranging unit 140 is converted to the reduction mode for rearranging information about a macroblock so as to reduce data stored in the buffer 120. When the macroblock information rearranging unit 140 is converted to the reduction mode, the macroblock information rearranging unit 140 rearranges information about a predetermined macroblock.

The information about a macroblock, which is rearranged by the macroblock information rearranging unit 140, may be data of the macroblock, an encoded bit string of the data of the macroblock, syntax, or motion information. The macroblock information rearranging unit 140 may rearrange at least one of image data, frequency transformed data, quantized data, estimated motion information, and a transmission bit of a macroblock, according to a predetermined encoding operation of the encoding unit 110.

More specifically, when the data accumulation rate of the buffer 120 exceeds the first threshold value, the macroblock information rearranging unit 140 may delete predetermined data from among the information about the predetermined macroblock. Here, the predetermined macroblock may be a macroblock before being frequency transformed, a frequency transformed macroblock, or a quantized macroblock, according to an encoding operation order.

A method of deleting predetermined data from among the information about the predetermined macroblock may be performed differently according to the encoding operation order. Since the macroblock before being frequency transformed is data in a space domain, predetermined data is converted to a predetermined constant value so that the predetermined data is deleted later according to a result of encoding. Predetermined data of the frequency transformed or quantized macroblock is deleted by converting the predetermined data to 0.

The predetermined data that is converted to the predetermined constant value according to the rearrangement of the information of the predetermined macroblock may be entire data or partial data of the predetermined macroblock.

In the reduction mode, the macroblock information rearranging unit 140 may delete a symbol of a macroblock, which causes an overflow of the buffer 120, from among the encoded bit string of the image.

Alternatively, in the reduction mode, the macroblock information rearranging unit 140 may set the macroblock that generates overflow as one in a skip mode, and perform motion estimation. According to the video compression standard, when setting of a skip mode is not limited, specifically in an intra-coded frame (I frame), a macroblock of the I frame may be set in the skip mode so as to be encoded. A macroblock in the skip mode is estimated by using an adjacent macroblock. Alternatively, data of a macroblock in the skip mode may be estimated to a predetermined constant value calculated by using the adjacent macroblock.

Alternatively, when a macroblock to be encoded in the reduction mode is a macroblock of a predictive coded frame (P frame), the macroblock information rearranging unit 140 may set the macroblock as an inter block and perform motion estimation. A motion vector for an inter block may be transmitted by being included in a transmission bit string. Alternatively, the motion vector of the inter block may not be transmitted so as to minimize the amount of transmission data.

The apparatus 100 may transmit information indicating that a macroblock is in a skip mode or is an inter block.

The encoding unit 110 performs a predetermined encoding operation on a macroblock having information that is rearranged by the macroblock information rearranging unit 140. When the data accumulation rate of the buffer 120 decreases to the second threshold value due to the rearrangement of the information about the macroblock in the reduction mode, the macroblock information rearranging unit 140 stops the reduction mode so as to perform an encoding operation by using actual information about the macroblock.

The apparatus 100 may be applied in a streaming service or real time streaming, wherein a delay time between encoding and decoding is within one frame. The apparatus 100 may be implemented partially or completely by a hardware encoder or a programmed processor. For example, the encoding unit 110 may be partially implemented by a hardware encoder, and then the encoded data by the encoded unit 110, further processed via the buffer 120, the buffer checking unit 130, and the macroblock information rearranging unit 140, may be output, and transmitted to a decoding terminal or stored in a storage medium.

Figure 2:
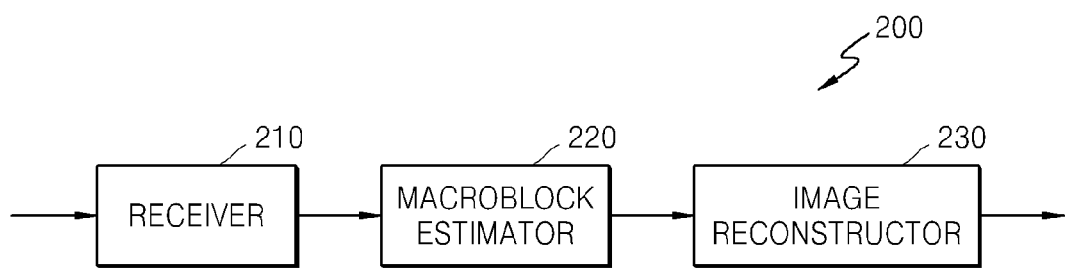
FIG. 2 is a block diagram illustrating an apparatus for decoding an image bit string via real time streaming, according to an exemplary embodiment of the present invention.

FIG. 2 is a block diagram illustrating an apparatus 200 for decoding an image bit string via real time streaming, according to an exemplary embodiment of the present invention.

The apparatus 200 according to the exemplary embodiment of the present invention includes a receiver 210, a macroblock estimator 220, and an image reconstructor 230.

The receiver 210 receives a bit string of an image via a channel. The macroblock estimator 220 estimates data of a macroblock in the bit string received from the receiver 210, based on encoding information of a macroblock, which is rearranged in a macroblock unit based on a storage status of a buffer while encoding the bit string. The image reconstructor 230 reconstructs the image by using image data in the received bit string and the data estimated by the macroblock estimator 220.

The reconstructed image by the image reconstructor 230 may be displayed by a display device, or stored in a storage medium.

The bit string received from the receiver 210 of the apparatus 200 may be a bit string encoded based on a storage status of the buffer 120 of the apparatus 100 of FIG. 1. The bit string may be received from a channel in a real time streaming environment in which a delay time between encoding and decoding is equal to or less than one frame.

The received bit string may be parsed so that the image data, information related to encoding/decoding, or the like is extracted. Information about a method of determining a reference block of a macroblock may be extracted from the received bit string. The method of determining a reference block may be performed by using a skip mode or a direct mode, or an inter block or an intra block when a macroblock is a macroblock of a P frame.

The macroblock estimator 220 may estimate a current macroblock according to the method of determining a reference block. For example, a reference block or reference information of a macroblock is determined based on whether the current macroblock is a macroblock of an I frame or a P frame, or is an inter block or an intra block.

More specifically, when a current macroblock is set in a skip mode, the macroblock estimator 220 may estimate the current block by using a macroblock adjacent to the current macroblock. Alternatively, in the skip mode, the macroblock estimator 220 may replace the current macroblock with a predetermined constant value by using the adjacent macroblock.

When the current macroblock is set as an inter block of a P frame, the macroblock estimator 220 reconstructs the current macroblock by using a reference macroblock of a reference frame.

The apparatus 200 may be applied in a real time streaming environment in which a delay time between encoding and decoding of an image is within one frame.

Information about a macroblock may be rearranged in a macroblock unit when a data accumulation rate of a buffer exceeds a first threshold value during an encoding process, and when the data accumulation rate of the buffer decreases to a second threshold value due to the rearrangement of the information about the macroblock unit, the bit string received by the receiver 210 may be encoded by using actual information of the macroblock. The rearranged information may be data of the macroblock, a bit string corresponding to the macroblock, or motion information corresponding to the macroblock.

More specifically, the information about the macroblock is rearranged by deleting predetermined data from among information about a macroblock having a predetermined encoding operation order while encoding the image. Here, the macroblock having a predetermined encoding operation order may be at least one of a macroblock before being frequency transformed, a frequency transformed macroblock, and a quantized macroblock.

Alternatively, the information about the macroblock may be rearranged by deleting a symbol of the macroblock in the encoded bit string of the image during the encoding process.

The apparatus 200 may be implemented partially or completely by a hardware encoder or a programmed processor.

When a buffer in an encoding unit overflows in a streaming service in which a delay time is very short, a decoding unit may reconstruct a distorted image due to a delay of the data transmission. Specifically, when the data transmission is delayed due to overflow of a buffer in a real time streaming service in which a delay time is equal to or less than one frame unit, distortion of a distorted image may be propagated to data to be reconstructed next during a decoding process, before the delay of the data transmission is solved.

Accordingly, the apparatus 100 according to the exemplary embodiment of the present invention minimizes cases when transmission of an encoded bit string of an image is delayed, by checking a storage status of the buffer 120 in a data unit equal to or less than a macroblock and performing a process for reducing transmission data in a macroblock unit, during an encoding process.

Also, the apparatus 200 according to the exemplary embodiment of the present invention receives a bit string of an image in which transmission information is adjusted in a macroblock unit by checking a storage status of a buffer in a data unit equal to or less than a macroblock during an encoding process. Accordingly, transmission delay caused by a buffering and streaming imbalance does not spread to other macroblocks, and thus an image may be stably reconstructed.

Figure 3:
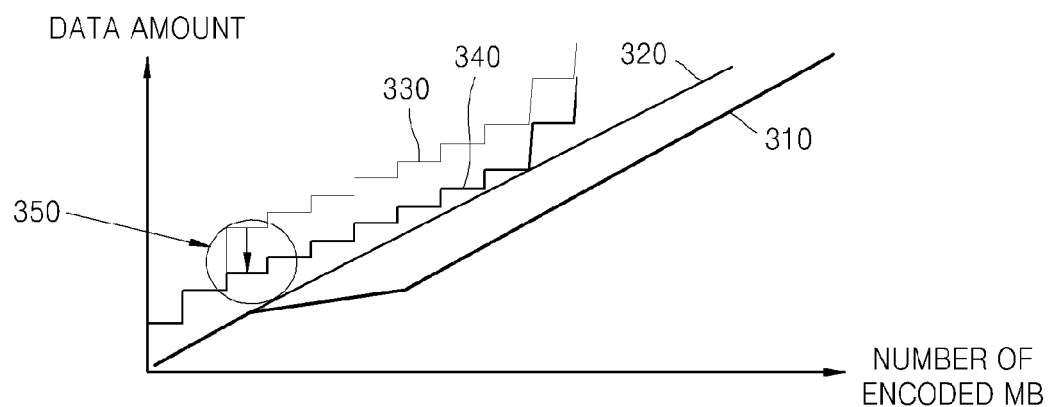
FIG. 3 is a graph illustrating a case when encoded data remains in a buffer.

FIG. 3 is a graph illustrating a case when encoded data remains in a buffer.

A bit generated in an encoding unit is transmitted to a decoding unit via a channel. A graph illustrated in FIG. 3 shows a mapping relationship between an encoding progress in a macroblock unit and an accumulated data amount. Data transmission speed of the channel is generally fixed, and thus a transmitted accumulated data amount 320 uniformly increases. However, since a bit amount generated as the encoding unit performs encoding in a macroblock unit varies according to a macroblock, an accumulated bit amount 330 irregularly increases.

Even when a conventional rate control algorithm is applied, a sudden increase in bit amount is difficult to prevent. For example, an encoded bit amount may remarkably increase when image information, such as texture information of a macroblock, is not remarkably reduced because an image is not successfully estimated via inter estimation or intra estimation, or when a bit rate is adjusted in an non-uniform channel environment but an effect of adjusting the bit rate is not yet reflected.

A differential data amount between an encoded data amount of an image and a transmittable data amount of a channel is accumulated in a buffer of the encoding unit, as transmitting and encoding continue. When such a difference increases the buffer may overflow.

The transmittable data amount may temporarily decrease due to a temporary problem of the channel, and accordingly, an accumulated data amount 310 transmittable via the channel decreases more. In this case, the difference increases more, and thus a possibility of the buffer overflowing increases.

In order to prevent the buffer from overflowing, the apparatus 100 according to an exemplary embodiment of the present invention checks a storage status of the buffer for every data unit equal to or less than a macroblock. When the buffer seems to overflow, a bit amount generated in the encoding unit is adjusted in a macroblock unit so as to decrease a bit amount 350 that exceeds the capacity of the buffer. By adjusting the bit amount generated in the encoding unit so that the buffer does not overflow, an increase in an accumulated bit amount 340 according to the encoding progress is maintained without any big change.

The apparatus 200 according to an exemplary embodiment receives the accumulated bit amount 340, wherein bits are adjusted according to a data accumulation rate of a buffer of an encoding unit, and thus smooth real time streaming is possible.

Figure 4:
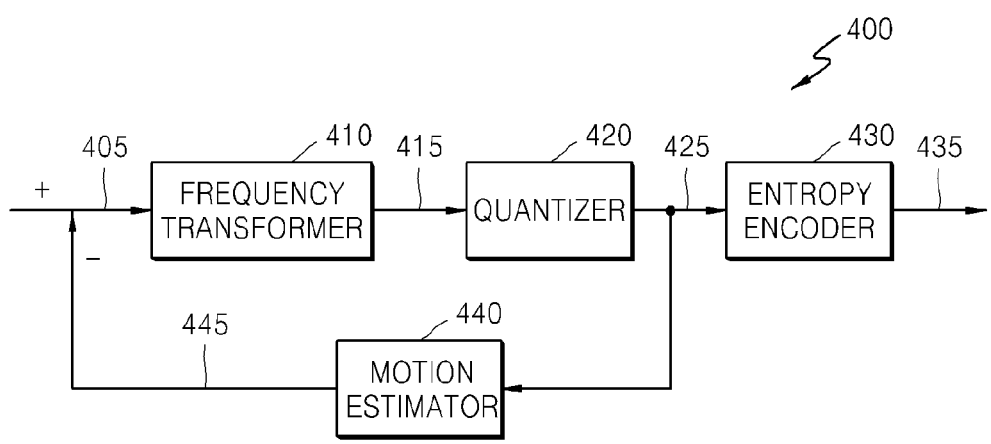
FIG. 4 is a diagram for describing several exemplary embodiments of rearranging data according to a macroblock according to an exemplary embodiment of the present invention.

FIG. 4 is a diagram for describing several exemplary embodiments of rearranging data according to a macroblock according to an exemplary embodiment of the present invention.

The macroblock information rearranging unit 140 of FIG. 1 according to an exemplary embodiment may rearrange information about a macroblock that undergoes a predetermined process of a frequency transformer 410, a quantizer 420, an entropy encoder 430, or a motion estimator 440 of an encoding unit 400, in order to adjust a bit amount to be transmitted, when a data accumulation rate of the buffer 120 exceeds a first threshold value.

For example, the macroblock information rearranging unit 140 may convert predetermined data from among image data of a macroblock 405 before being input to the frequency transformer 410, into a predetermined constant value. Also, the macroblock information rearranging unit 140 may convert predetermined data of a macroblock 415 that is frequency transformed by the frequency transformer 410, into 0. Also, the macroblock information rearranging unit 140 may convert predetermined data of a macroblock 425 that is quantized by the quantizer 420, into 0. Here, the predetermined data of the macroblocks 405, 415, and 425 may be entire or partial data of the macroblocks 405, 415, and 425.

The macroblock information rearranging unit 140 may not only rearrange data of a macroblock, but may also rearrange a bit string 435 as encoding information of the macroblock. Information about the macroblock may be deleted from among syntaxes indicating the encoding information. For example, a partial bit of the bit string 435 generated by the entropy encoder 430 may be deleted.

The macroblock information rearranging unit 140 may rearrange information 445 related to motion information, as encoding information of a macroblock. For example, the macroblock information rearranging unit 140 may set a macroblock in a skip mode. The macroblock in a skip mode may be estimated by using an adjacent macroblock or may be replaced by a predetermined constant value variable adaptively to the adjacent macroblock.

Also, when a current frame is a P frame, the macroblock information rearranging unit 140 may set the current macroblock as an inter block. The inter block may be estimated by duplicating data of a reference macroblock of a reference image. The apparatus 100 may or may not transmit a motion vector for the inter block.

In an environment in which a delay time between encoding and decoding is equal to or less than one picture, when an error occurs in the encoding unit 400 due to a transmission delay of a predetermined picture, an image that is being delayed is already decoded and reproduced in a decoding unit. Accordingly, even when a buffer of the encoding unit 400 overflows, encoding of a currently reproduced image cannot be omitted, and thus data may be lost in the decoding unit since a transmission stream is not received.

Accordingly, the apparatus 100 checks a storage status of the buffer in a macroblock unit, and rearranges encoding information of a problematic macroblock so that the encoding information is smoothly transmitted in real time.

Figure 5:
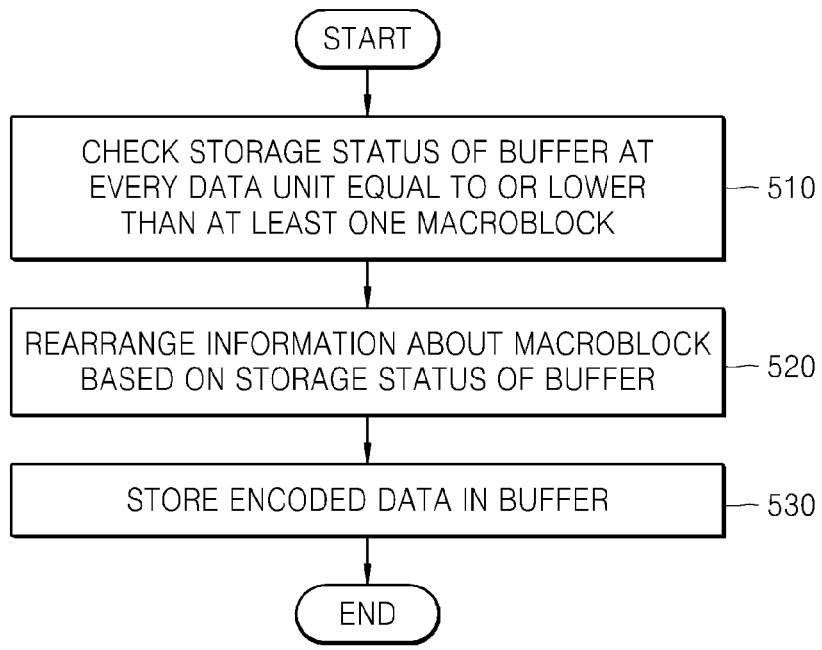
FIG. 5 is a flowchart of a method of encoding an image for real time streaming, according to an exemplary embodiment of the present invention.

FIG. 5 is a flowchart of a method of encoding an image for real time streaming, according to an exemplary embodiment of the present invention.

In operation 510, a storage status of a buffer is checked for every data unit equal to or less than at least one macroblock. The buffer stores an encoded bit string before transmission.

In operation 520, information about a macroblock is rearranged in such a way that encoded data of the macroblock is reduced, based on the storage status of the buffer. The information about the macroblock may be, for example, but not limited to, at least one of image data, frequency transformed data, quantized data, information related to motion estimation, a bit string, and syntax of the macroblock.

Partial data from among data of the macroblock that may generate overflow in the buffer may be deleted. Alternatively, the macroblock may be set in a skip mode so that the data of the macroblock is not required to be encoded. When the macroblock is a macroblock of a P frame, the macroblock may be set as an inter block, and encoding information of the macroblock may be converted so that the macroblock is predicted by using a reference macroblock of a previous image.

In operation 530, data encoded by using the image data and the information about the macroblock, which is rearranged based on the storage status of the buffer, is stored in the buffer. A bit string stored in the buffer is transmitted to a decoding unit via a channel.

The method 100 may be implemented partially or completely by a hardware encoder or a programmed processor. For example, the encoding unit 110 may be partially implemented by a hardware encoder, and then the encoded data by the encoded unit 110, further processed via the buffer 120, the buffer checking unit 130, and the macroblock information rearranging unit 140, may be transmitted to a decoding terminal or a storage medium.

Figure 6:
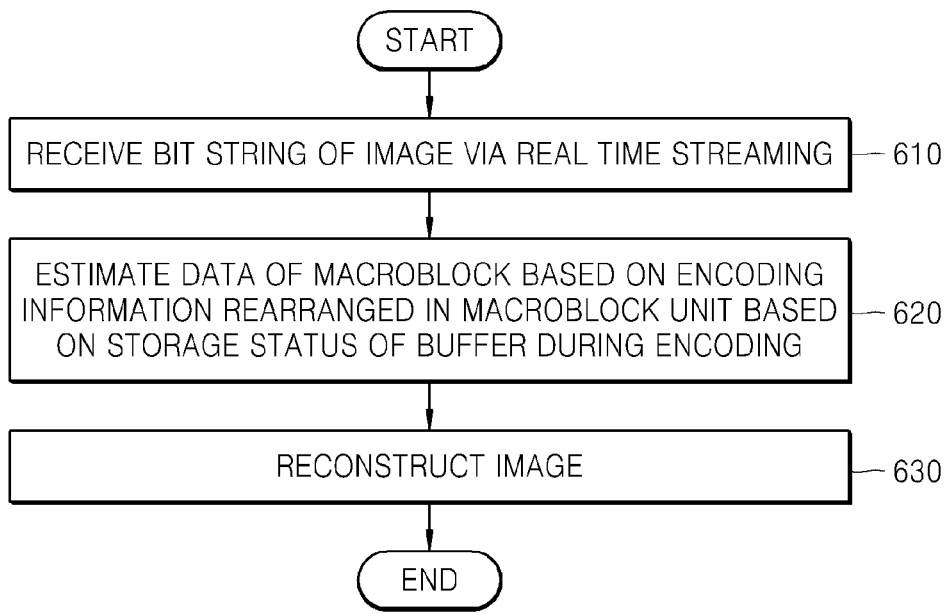
FIG. 6 is a flowchart of a method of decoding an image bit string via real time streaming, according to an exemplary embodiment of the present invention.

FIG. 6 is a flowchart of a method of decoding an image bit string via real time streaming, according to an exemplary embodiment of the present invention.

In operation 610, a bit string of an image is received via a channel. The bit string may be received via a channel in a real time streaming environment in which a delay time of encoding and decoding is equal to or less than one frame.

In operation 620, data of a macroblock is estimated based on encoding information rearranged in a macroblock unit based on a storage status of a buffer during encoding of the bit string. The encoding information rearranged in a macroblock unit in an encoding unit may be, for example, but not limited to, at least one of image data, frequency transformed data, quantized data, a bit string, and information related to motion estimation of the macroblock.

When the macroblock is set in a skip mode regarding motion estimation, the macroblock may be estimated by using a macroblock adjacent to the macroblock. Also, when the macroblock is set as an inter block, the macroblock may be estimated by using a reference macroblock of a previous image.

In operation 630, an image is reconstructed by using data of the estimated macroblock.

The method of encoding an image for real time streaming referring to FIG. 5 and the method of decoding an image bit string via real time streaming referring to FIG. 6 may be implemented by a programmed processor as well as software respectively.

The exemplary embodiments of the present invention can be implemented partially or completely by electronic circuitry including, for example, but not limited to, discrete electronic components, integrated circuits, programmable logic circuits, hybrid circuit modules, application specific integrated circuits, processors, and combinations thereof.

The exemplary embodiments of the present invention can also be provided as computer programs embodied in a computer readable recording medium and can be implemented in general-use digital computers that execute the programs using a computer readable recording medium. Examples of the computer readable recording medium include, but are not limited to, tangible media such as magnetic storage media (e.g., ROM, floppy disks, hard disks, etc.), and optical recording media (e.g., CD-ROMs, or DVDs).

While this invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the exemplary embodiments but by the appended claims, and all differences within the scope will be construed as being included in the present invention.

What is claimed is:

1. A method of encoding an image, the method comprising:
    determining a storage status of a buffer storing encoded data, for every data unit equal to or less than one macroblock;
    performing, if a data accumulation rate of the buffer exceeds a predetermined first threshold value based on the determined storage status of the buffer, a reduction mode for reducing data stored in the buffer by rearranging information about a macroblock having a predetermined encoding operation order so that encoded data of the macroblock is reduced; and
    stopping, if the data accumulation rate of the buffer decreases to a predetermined second threshold value due to the rearranging the information about the macroblock having the predetermined encoding operation order, the reduction mode and performing a predetermined encoding operation by using actual information of the macroblock under the predetermined encoding operation; and
    storing, in the buffer, data encoded by using data of the image, and the rearranged information about the macroblock.

2. The method of claim 1, wherein the macroblock has a predetermined encoding operation order.

3. The method of claim 2, wherein the rearranging the information about the macroblock comprises, if a data accumulation rate of the buffer exceeds a predetermined first threshold value, deleting predetermined data from among data of a macroblock having a predetermined encoding operation order.

4. The method of claim 3, wherein the macroblock having the predetermined encoding operation order comprises at least one of a macroblock before being frequency transformed, a frequency transformed macroblock, and a quantized macroblock.

5. The method of claim 2, wherein the rearranging the information about the macroblock comprises, if a data accumulation rate of the buffer exceeds a predetermined first threshold value, deleting a symbol of the macroblock from among an encoded bit string of the image.

6. The method of claim 2, wherein the rearranging the information about the macroblock comprises, if a data accumulation rate of the buffer exceeds a predetermined first threshold value, setting the macroblock in a skip mode.

7. The method of claim 6, wherein the macroblock set in the skip mode is estimated by using at least one macroblock adjacent to the macroblock.

8. The method of claim 6, further comprising transmitting information indicating that the macroblock is in the skip mode.

9. The method of claim 2, wherein the rearranging the information about the macroblock comprises, if the macroblock is a macroblock of a predictive coded frame and a data accumulation rate of the buffer exceeds a predetermined first threshold value, setting the macroblock as an inter block.

10. The method of claim 9, further comprising transmitting information indicating that the macroblock is the inter block.

11. The method of claim 1, wherein a delay time between encoding and decoding of the image is within one frame.

12. A non-transitory computer readable recording medium having recorded thereon a computer program comprising instructions for causing a computer to execute the method of claim 1.

13. A method of decoding an image, the method comprising:
receiving a bit string of the image via a channel;
estimating data of a macroblock, based on encoding information that is rearranged in a macroblock unit based on a storage status of a buffer while encoding the bit string; and
reconstructing the image by using the estimated data,
wherein the encoding information that is rearranged in the macroblock unit is generated by, if a data accumulation rate of the buffer exceeds a predetermined first threshold value during an encoding process, performing a reduction mode for reducing data stored in the buffer by rearranging information about the macroblock in the macroblock unit, and if the data accumulation rate of the buffer decreases to a predetermined second threshold value due to the rearranged information about the macroblock, stopping the reduction mode and performing a predetermined encoding operation by using actual information of the macroblock under the predetermined encoding operation.

14. The method of claim 13, wherein in the estimating the data of the macroblock, if a current macroblock is set in a skip mode, the current macroblock is estimated by using the current macroblock and an adjacent macroblock.

15. The method of claim 13, wherein the estimating the data of the macroblock comprises, if a current block is set in a skip mode, estimating data of the current macroblock as a predetermined constant value by using an macroblock adjacent to the current macroblock during a decoding process.

16. The method of claim 13, wherein the estimating the data of the macroblock comprises, if a current macroblock is set as an inter block of a predictive coded frame estimating the current macroblock by using a reference macroblock of a reference frame.

17. The method of claim 13, wherein a delay time between encoding and decoding of the image is within one frame.

18. The method of claim 13, wherein the encoding information that is rearranged in the macroblock unit indicates data of a macroblock that is rearranged after predetermined data from among data of a macroblock having a predetermined encoding operation order is deleted.

19. The method of claim 18, wherein the macroblock having the predetermined encoding operation order is at least one of a macroblock before being frequency transformed, a frequency transformed macroblock, and a quantized macroblock.

20. The method of claim 13, wherein the encoding information that is rearranged in the macroblock unit indicates a bit string that is rearranged after a symbol of the macroblock from among an encoded bit string of the image is deleted.

21. A non-transitory computer readable recording medium having recorded thereon a computer program comprising instructions for causing a computer to execute the method of claim 13.

22. An apparatus for encoding an image, the apparatus comprising:
a buffer which stores a bit string of encoded data;
a buffer checking unit which determines a storage status of the buffer for every data unit equal to or less than one macroblock; and
a macroblock information rearranging unit which, if a data accumulation rate of the buffer exceeds a predetermined first threshold value based on the determined storage status of the buffer, performs a reduction mode for reducing data stored in the buffer by rearranges information about a macroblock so that encoded data of the macroblock is reduced, if the data accumulation rate of the buffer decreases to a predetermined second threshold value due to the rearranging the information about the macroblock having the predetermined encoding operation order, stops the reduction mode and performs a predetermined encoding operation by using actual information of the macroblock under the predetermined encoding operation based on the determined storage status of the buffer,
wherein data encoded by using data of the image and the rearranged information about the macroblock is stored in the buffer.

23. An apparatus for decoding an image, the apparatus comprising:
a receiver which receives a bit string of the image via a channel;
a macroblock estimator which estimates data of a macroblock, based on encoding information that is rearranged in a macroblock unit based on a storage status of a buffer while encoding the bit string; and
an image reconstructor which reconstructs the image by using the estimated data,
wherein the encoding information that is rearranged in the macroblock unit is generated by, if a data accumulation rate of a buffer exceeds a predetermined first threshold value during an encoding process, performing a reduction mode for reducing data stored in the buffer by rearranging information about the macroblock in the macroblock unit and if the data accumulation rate of the buffer decreases to a predetermined second threshold value due to the rearranged information about the macroblock, stopping the reduction mode and performing a predetermined encoding operation by using actual information of the macroblock under the predetermined encoding operation.

* * * * *